G. CARTASSO.
SPRING WHEEL.
APPLICATION FILED JUNE 4, 1919.

1,344,579.

Patented June 22, 1920.

Inventor
Giacomo Cartasso.

By Harry C. Schroeder
Attorney

UNITED STATES PATENT OFFICE.

GIACOMO CARTASSO, OF OAKLAND, CALIFORNIA.

SPRING-WHEEL.

1,344,579.	Specification of Letters Patent.	Patented June 22, 1920.

Application filed June 4, 1919.  Serial No. 301,615.

*To all whom it may concern:*

Be it known that I, GIACOMO CARTASSO, a citizen of the United States, residing at Oakland, in the county of Alameda and State of California, have invented certain new and useful Improvements in Spring-Wheels, of which the following is a specification.

My invention is an improved spring wheel.

My invention is illustrated in the accompanying drawing which forms a part of this specification and the appended claims.

Referring to the drawing.

Figure 1:
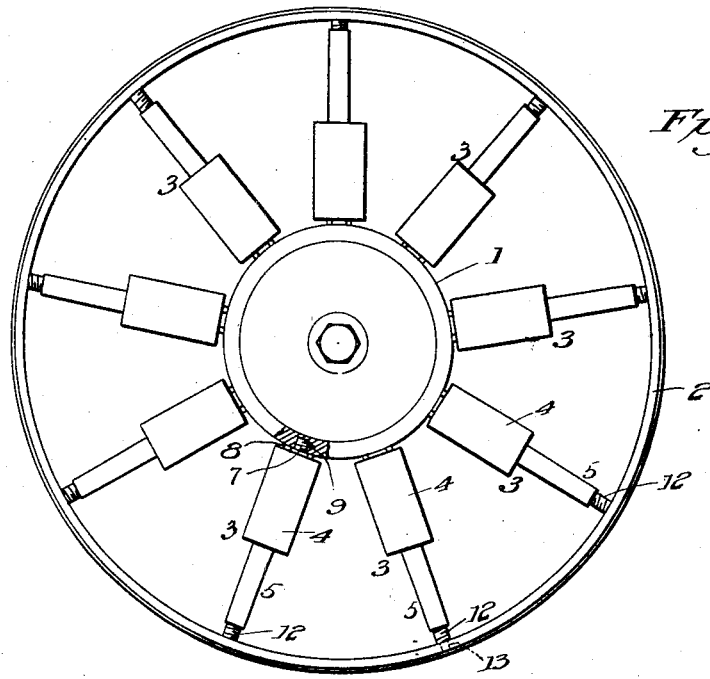
Figure 1 is a side elevation of my wheel.
Figure 2:
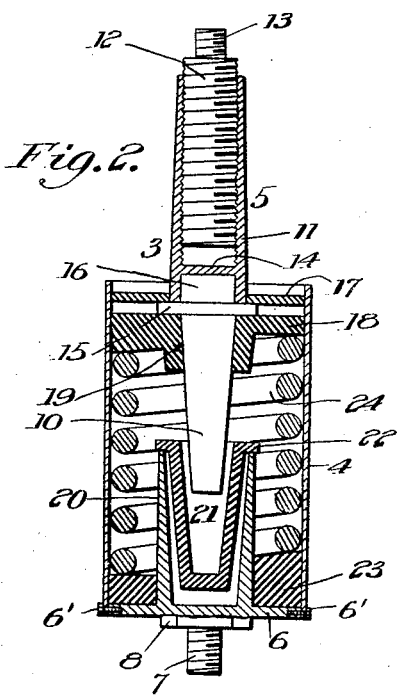
Fig. 2 is a longitudinal sectional view of the spokes which embodies the spring structure.

In the drawing, 1 indicates the hub, 2 the rim and 3 the spokes of my wheel. Each spoke includes two members, a cylinder 4 and a stem 5. The cylinder 4 has a head 6 detachably secured in one end by screws 6' on which head are a threaded stud 7 and a nut 8. The stud 7 is screwed into a threaded recess 9 in the hub 1, a wrench being applied to nut 8 for this purpose. The stem 5 is made in three sections 10, 11 and 12. The section 12 has a reduced outer end 13 which is threaded and screws into the rim 2, and its body is also threaded. The section 11 is a sleeve coupling having a transverse wall 14 near its inner end and is internally threaded from said wall to its outer end and screws onto the section 12 which is externally threaded. The section 10 has an annular flange 15 near its outer end and a stud 16 extending outwardly from said flange into the inner end of section 11 against the wall 14, the flange 15 engaging the inner end of section 11. The section 10 tapers to its inner end. The cylinder 4 has an elastic head 17 in its inner end through which the section 11 extends and which engages the flange 15 of section 10. In the cylinder is an elastic piston 18 having a conical central aperture 19 through which the conical portion of the section 10 extends, the plunger engaging the flange 15. On the head 6 extending into the cylinder 4 is a cup 20 in which rests an elastic conical cup 21 having an annular external flange 22 at its open end resting upon the end of the wall of cup 20. The section 10 extends into the cup 21. An elastic washer 23 surrounds the cup 20 and rests against the inner face of the head 6. A coil spring 24 fits within the cylinder 4, its ends bearing respectively against the washer 23 and the piston 18.

Shocks upon the wheel are absorbed by the spring 24, the hub moving relatively to the rim of the wheel and compressing the spring between the washer 23 and plunger 18. The section 10 fitting within the cup 21 maintains the cylinder 4 and stem 5 in operative alinement, allowing their proper relative lateral movement without noise, when the spoke is at an angle. The arrangement of the cylinders 4 and springs 24 at the inner ends of the spokes places the cushioning effect at the center of the wheel. The spokes may be adjusted longitudinally by turning coupling 11.

Having described my invention, I claim:

1. In a wheel, a hub, a rim, and spokes, each of said spokes comprising a cylinder secured to said hub and a stem secured to said rim and extending into said cylinder, an elastic piston in said cylinder mounted on said stem, a coil spring between said piston and the head at the inner end of said cylinder, and a cup mounted in the cylinder into which the inner end of said stem extends.

2. In a wheel, a hub, a rim, and spokes, each of said spokes comprising a cylinder secured to said hub and a stem secured to said rim and extending into said cylinder, an elastic piston in said cylinder mounted on said stem, a coil spring between said piston and the head at the inner end of said cylinder, and an elastic cup mounted in said cylinder into which the inner end of said stem projects.

3. In a wheel, a hub, a rim, and spokes, each of said spokes comprising a cylinder secured to said hub and a stem secured to said rim and extending into said cylinder, an elastic piston in said cylinder mounted on said stem, a coil spring between said piston and the head at the inner end of said cylinder, said stem tapering to its inner end and an elastic conical cup mounted in said cylinder to receive said stem.

4. In a wheel, a hub, a rim, and spokes, each of said spokes comprising a cylinder secured to said hub and a stem secured to said rim and extending into said cylinder, an elastic piston in said cylinder mounted on said stem, a coil spring between said piston and the head at the inner end of said cylinder, a cup on said cylinder head extending within said cylinder, and an elastic cup mounted within said first cup to receive the inner end of said stem.

5. In a wheel, a hub, a rim, and spokes, each of said spokes comprising a cylinder secured to said hub and a stem secured to said rim and extending into said cylinder, an elastic piston in said cylinder mounted on said stem, a coil spring between said piston and the head at the inner end of said cylinder, a cup on said cylinder head extending within said cylinder, an elastic cup within said first cup, and an annular flange on the open end of said elastic cup resting upon the edge of said first cup.

6. In a wheel, a hub, a rim, and spokes, each of said spokes including a cylinder secured to said hub and a stem secured to said rim and extending into said cylinder, an elastic piston in said cylinder mounted on said stem, an elastic washer resting against the head at the inner end of said cylinder, and a coil spring within said cylinder bearing against said piston and said washer.

In testimony whereof I affix my signature.

GIACOMO CARTASSO.